United States Patent [19]

Hansen

[11] 4,289,437
[45] Sep. 15, 1981

[54] SILO UNLOADER LOWERING CONTROL

[75] Inventor: Glen D. Hansen, Maple Plain, Minn.

[73] Assignee: Veda, Inc., Long Lake, Minn.

[21] Appl. No.: 3,014

[22] Filed: Jan. 12, 1979

[51] Int. Cl.³ .............................................. B65G 65/38
[52] U.S. Cl. ..................................... 414/315; 406/114
[58] Field of Search ............... 414/313, 315, 316, 323, 414/263; 406/32, 10, 114; 222/404, 405, 64; 104/38; 299/87, 39; 173/4, 147; 175/27

[56] References Cited

U.S. PATENT DOCUMENTS

| | | | |
|---|---|---|---|
| 2,430,203 | 11/1947 | Bailey | 414/323 |
| 2,511,246 | 6/1950 | Chamberlin | 406/30 |
| 2,518,601 | 8/1950 | Cordis | 414/323 X |
| 2,580,306 | 12/1951 | Leach et al. | 406/114 X |
| 2,663,594 | 12/1953 | Dennick | 414/323 X |
| 2,719,058 | 9/1955 | Van Dusen | 406/114 X |
| 3,204,786 | 9/1965 | Kucera | 414/314 |
| 3,217,907 | 11/1965 | Buschbom | 406/114 X |
| 3,235,229 | 2/1966 | Buschbom | 254/186 R |
| 4,094,252 | 6/1978 | Pater et al. | 104/38 X |

FOREIGN PATENT DOCUMENTS 1111488  4/1968  United Kingdom ................ 414/313

OTHER PUBLICATIONS

Butler Manufacturing Company Brochure, "Automatic Lowering Control for V-II Silage Distributor-Unloader", 3-1974.

Primary Examiner—Trygve M. Blix
Assistant Examiner—Edmond G. Rishell, Jr.
Attorney, Agent, or Firm—Burd, Bartz & Gutenkauf

[57] ABSTRACT

A top unloading silo unloader pendently supported from a tripod with a cable connected to a motor operated winch. An automatic silo unloader let-down control system is operably connected to the winch motor to energize the motor once during each revolution of the unloader to lower the unloader in the silo. The let-down control system has a control switch mounted on the unloader which is actuated by the rotating part of the unloader once during each revolution of the part. An automatic time delay unit is adjustable to control the duration of operation of the winch motor thereby controlling the amount of let-down of the silo unloader.

10 Claims, 5 Drawing Figures

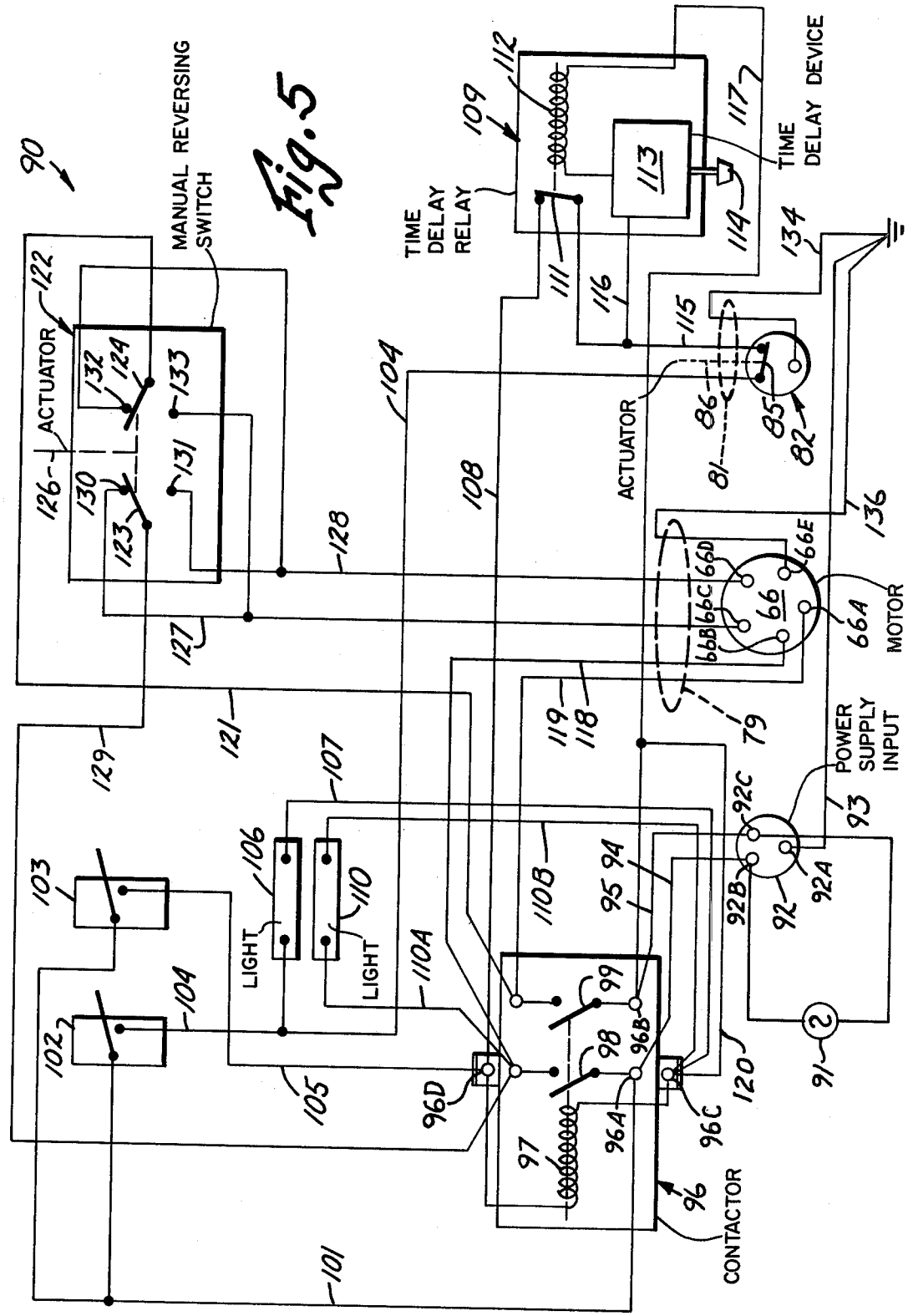

SILO UNLOADER LOWERING CONTROL

SUMMARY OF INVENTION

The invention is directed to control means for locating a material unloading apparatus relative to material being unloaded by the apparatus. The control means is more particularly associated with a top unloading silo unloader and power operated winch connected to the unloader with a suspension cable. The control means has a control switch mounted on the unloader that is opened once during each revolution of the unloader. The control switch is connected in series with an automatic time delay unit having an adjustable component controlling the duration of operation of the winch motor. The winch motor operates each revolution of the unloader to lower the unloader a predetermined amount in the silo. A continuous motor operating switch is included in the control means to provide the operator with means for continuously operating the winch motor to either raise or lower the silo unloader in the silo.

IN THE DRAWINGS

FIG. 4 is an enlarged perspective view of the control switch of FIG. 2; and

FIG. 5 is an electrical circuit diagram of the automatic silo unloader let-down control.

DESCRIPTION OF PREFERRED EMBODIMENT

Figure 1:
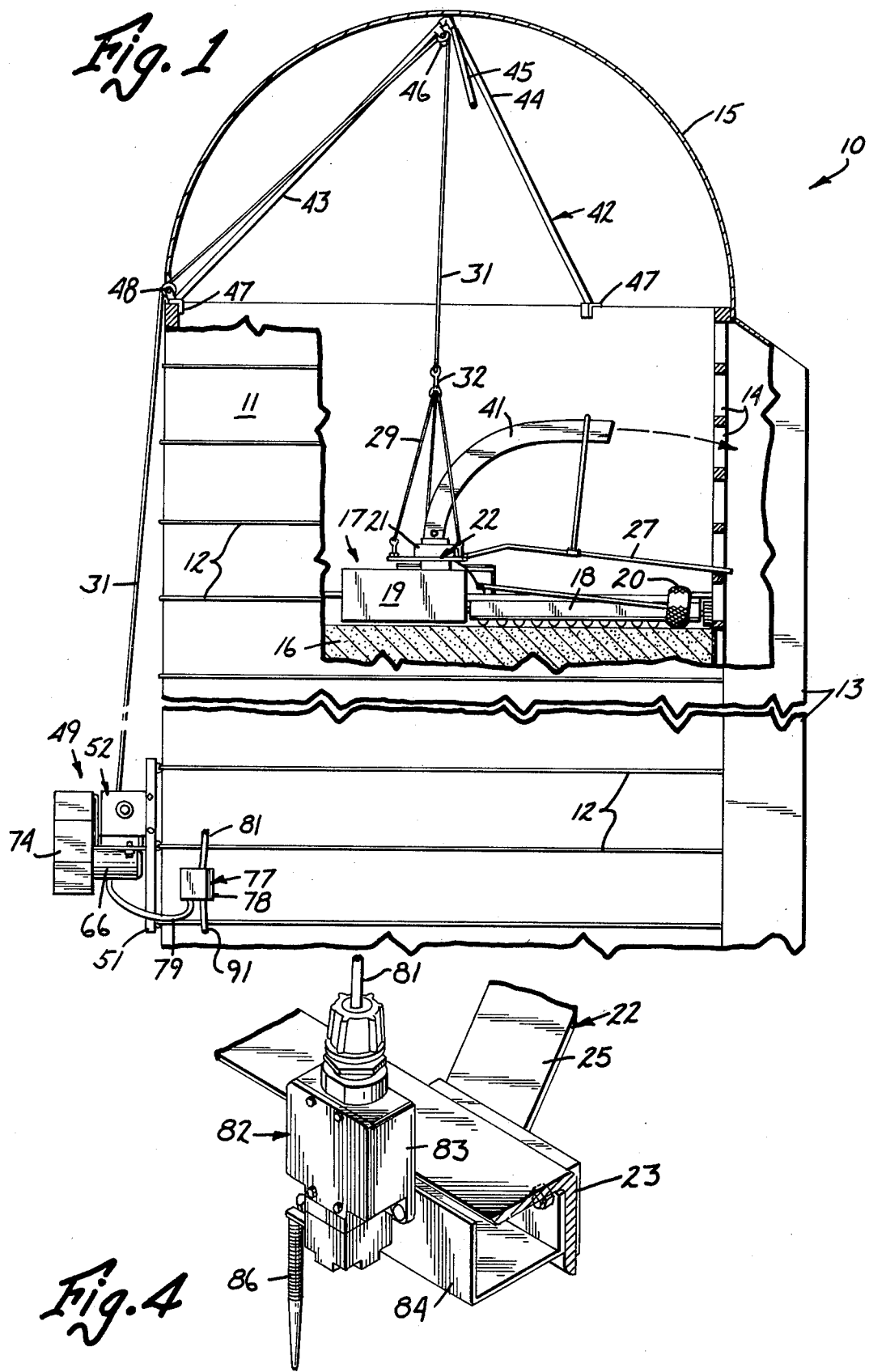
FIG. 1 is a foreshortened side elevational view of a tower silo, partly in section, and a top unloading silo unloader equipped with an automatic silo unloader let-down control.

Referring to FIG. 1, there is shown a tower silo indicated generally at 10. Silo 10 is a conventional material storing structure having a cylindrical upright side wall 11 reinforced with circular bands or hoops 12. Side wall 11 can be concrete or cement staves or made of plastic or metal material. Side wall 11 has a plurality of openings or doorways 14 that are open to an upright chute 13. Chute 13 extends from the top to the bottom of side wall 11 and provides a passageway for directing material to the base of silo 10. The top of side wall 11 is covered with an arched roof 15. Animal feed 16, as silage, haylage, and the like, is stored in silo 10. Other types of materials can be stored in silo 10.

Animal feed 16 is removed from silo 10 with a top unloading silo unloader indicated generally at 17. Unloader 17 operates to collect the feed and discharge the feed through a doorway 14 in the silo wall 11 into the passageway of chute 13. The feed falls down the chute passageway to the base of the silo.

Silo unloader 17 can be the silo unloader disclosed in U.S. Pat. No. 4,170,385, or silo unloader shown in U.S. Pat. Nos. 3,822,796; 3,651,910; 3,547,283; and 3,522,971.

Unloader 17 has an elongated feed collector 18 extended from the central area of the silo to wall 11. Collector 18 has conveying means, such as one or more augers for moving the feed toward a transfer means 19. Transfer means 19 moves the feed through an out chute 41 which directs the feed through doorway 14 into chute 13. Transfer means 19 includes an impeller rotatably mounted in an impeller housing for receiving the material from the collector 18 and discharging the material to out chute 41. A slip ring assembly 21 is mounted on top of transfer means 19. Slip ring assembly 21 can be constructed in accordance with the transition assembly shown in U.S. Pat. Nos. 3,181,715; 3,438,123; and 3,517,369. The slip ring assembly has a non-rotating upper portion and a rotating lower portion. Other types of slip ring assemblies can be used with silo unloader 17. Slip ring assembly 21 is used to conduct the electrical power from the power line to the electric motor that drives the conveyor of collector 18 and the impeller of transfer means 19. A motor also drives drive wheel structure 20 operable to move collector 18 around the silo.

Figure 2:
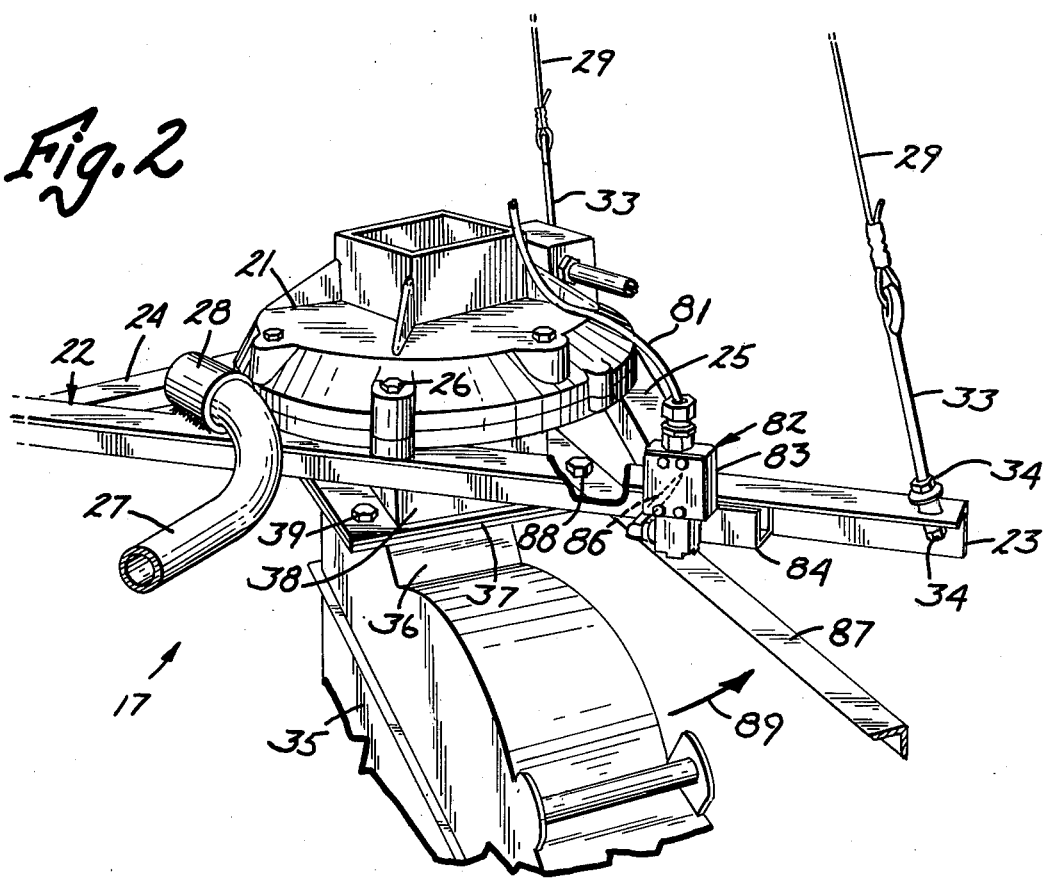
FIG. 2 is an enlarged perspective view of the silo unloader support structure and slip ring assembly carrying the control switch of the automatic silo unloader let-down control of FIG. 1.

As shown in FIGS. 1 and 2, a support frame indicated generally at 22 is mounted on slip ring assembly 21. Support frame 22 comprises three bars 23, 24, and 25 triangularly oriented about slip ring assembly 21. Bolts 26 secure bars 23, 24, and 25 to the non-rotatable portion of slip ring assembly 21. A torque arm 27 is pivotally connected to frame 22 with a short sleeve 28. Sleeve 28 is secured by welds to bar 23. Torque arm 27 extends through a doorway 14 and engages silo wall 11 to maintain out chute 41 in alignment with the doorway 14.

Unloader 17 is pendently supported in silo 10 by a cable arrangement 29 and a single cable 31. A ring or loop connection 32 connects the upper end of the cable arrangement 29 to single cable 31. As shown in FIG. 2, the lower ends of cables 29 are connected with an elongated eye bolt 33 attached with nuts to the outer ends of bars 23, 24, and 25. The structure for supporting and holding cable 31 is hereinafter described.

Referring to FIG. 2, transfer means 19 has an impeller housing 35 having an upwardly directed discharge neck 36. An annular collar or plate 37 is secured to the upper end of neck 36. A square boot or tube 38 is mounted on plate 37 with a plurality of nut and bolt assemblies 39. Discharge chute 41 is pivotally connected to the discharge or upper end of slip ring assembly 21 whereby the feed moved by the impeller located in the housing 35 is moved upwardly through slip ring assembly 21 and directed laterally by discharge chute 41 toward doorway 14.

Returning to FIG. 1, a tripod assembly indicated at 42 is mounted on top of silo wall 11. An example of the tripod assembly is shown in U.S. Pat. No. 3,211,407. Other types of support assemblies can be used to centrally locate cable 31 to pendently support silo unloader 17 in the silo. Tripod assembly 42 has three legs 43, 44, and 45 joined at their upper ends and supporting a rotatable pulley 46. Cable 31 is trained over pulley 46 and a second pulley 48 directing the cable downwardly to a power winch indicated generally at 49. The lower ends of the legs 43, 44, and 45 each carry a foot 47 which supports the tripod assembly 42 on the top of silo wall 11.

Power winch 49 is located on the outside of wall 11 adjacent the base of silo 10. A pair of upright bars or angle irons 51 mount winch 49 on hoops 12. Suitable connectors, as U-bolts, attach bars 51 to hoops 12. Other structures can be used to attach the winch 49 to silo wall 11 or hoops 12. Also, winch 49 can be attached to anchor structure fixed to the ground. Examples of winches for accommodating a cable used to support a silo unloader are disclosed in U.S. Pat. Nos. 3,217,907 and 3,235,229.

Figure 3:
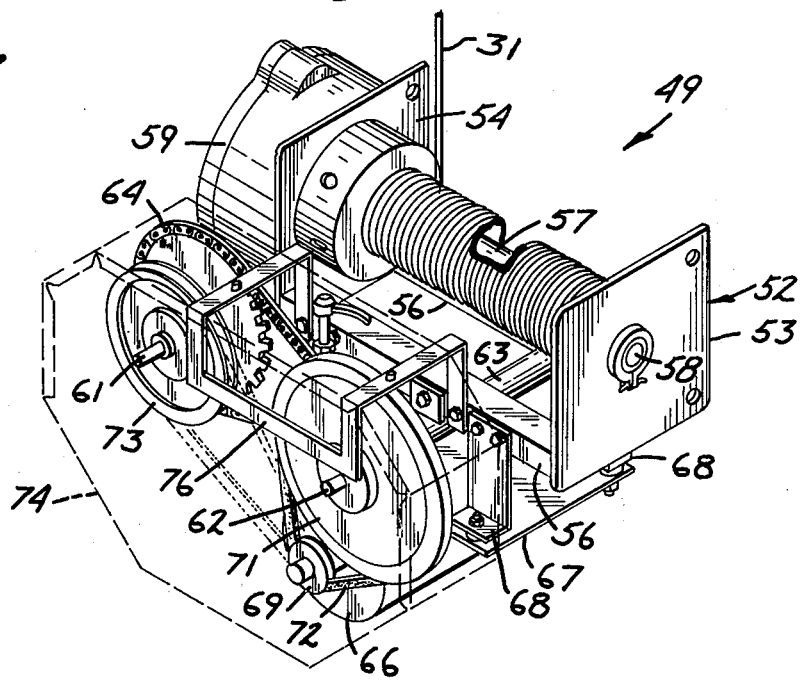
FIG. 3 is a perspective view of the power winch used to lower the silo unloader in the tower silo.

Referring to FIG. 3, power winch 49 has a frame indicated generally at 52 that is attached to upright bars 51 with suitable nut and bolt assemblies. Frame 52 has a pair of flat side upright side plates 53 and 54 located in laterally spaced relation. Lower portions of plates 53 and 54 are secured to a pair of beams 56. A spool 57 is interposed between plates 53 and 54. Spool 57 is mounted on a shaft 58 extended to a gear box 59. Gear box 59 attached to the outside of plate 54 has a worm and worm gear arrangement. The worm is connected to an input shaft 61. The gear box output shaft is the shaft 58. A second or counter shaft 62 extended parallel to the worm shaft 61 is rotatably mounted in a sleeve 63. Sleeve 63 is secured to the bottom portions of beams 56. A chain and sprocket drive 64 drivably connects shafts 61 and 63.

A reversing electric motor 66 is operable to drive the worm gear shaft 61 and thereby selectively rotate spool 57 in opposite directions. Motor 66 is mounted on the bottom side of a plate 67. A plurality of downwardly directed brackets 68 mount plate 67 to beams 56. Motor 66 has a small drive pulley 69 aligned with a first large pulley 71 mounted on counter shaft 62. A V-belt 72 drivably connects the pulleys 69 and 71. A second V-belt pulley 73 is mounted on the worm shaft 61. The second pulley 73 is adapted to accommodate a second V-belt, shown in broken lines, in lieu of V-belt 72. When V-belt 72 is drivably connected to the pulleys 69 and 71, winch 49 is operated at a slow speed. For high speed operation, a second V-belt is trained about pulleys 69 and 73 whereby motor 66 is in a direct drive relationship with worm shaft 61 and rotates shaft 61 at a faster rate of speed than when shaft 61 is driven via the chain and sprocket drive 64 and pulleys and belt drive 69, 71, and 72.

The chain and sprocket drive 64 and the pulley and belt drives 69, 71, and 72 are enclosed within a shield 74, as shown in broken lines, mounted on a bracket 76. Bracket 76 is secured to the side of beam 56.

Cable 31 is wound around spool 57. Motor 66 is operated to selectively rotate spool 57 in opposite directions and thereby raise or lower silo unloader 17 in the silo 11. An automatic let-down control system indicated generally at 77 is operative to sequentially operate winch motor 66 to lower silo unloader 17 in the silo during the operation of the silo unloader.

Referring to FIGS. 1, 2, and 4, control system 77 has a control box 78 mounted on silo wall 11. Box 78 can be located in other accessible locations. A cable 79 containing suitable electrical lines connects control box 78 to motor 66. A second cable 81 connects control box 78 to a control switch 82 mounted on frame 22. As shown in FIGS. 2 and 4, control switch 82 has a box shaped housing 83 attached to a mount 84. Mount 84 is attached to bar 23 with suitable fasteners, such as nut and bolt assemblies. Control switch 82 is an electrical switch having a movable actuator or finger 86. Switch 82 is normally closed when actuator 86 is in a downwardly directed position as shown in FIG. 4. Switch 82 is opened once during each revolution of unloader collector 18. As shown in FIG. 2, an elongated generally horizontal arm 87 located above impeller housing 35 extends in the direction of collector 18. Nut and bolt assemblies 88 secure arm 87 to rotatable boot 38. Arm 87 moves in horizontal circumferential direction as indicated by arrow 89 along with collector 18.

Referring to FIG. 5, there is shown the electrical circuit diagram or wiring diagram indicated generally at 90 for electrically coupling control switch 82 with the reversible electrical motor 66. The components of the electrical circuit are located in control box 78. A power supply 91 is connected across terminals 92B and 92C of the power supply input 92. Power supply input may be a connector for receiving a threeprong electrical plug leading to the power supply. In the preferred embodiment, the power supply is a conventional AC electric power source. A conductor 93 connects terminal 92A of plug 92 to ground. A pair of conductors 94 and 95 connect terminals 92B and 92C to terminals 96A and 96B, respectively, of a contactor indicated generally at 96. Contactor 96 has a coil 97 operative to control a pair of movable switching elements 98 and 99 which are connected to terminals 96A and 96B, respectively. A conductor 101 connected to terminal 96A leads to an "automatic let-down switch" 102 and a "continuous switch" 103. Switches 102 and 103 are manually operable, normally open, single pole, single throw switches. A conductor 104 connects the contact of switch 102 to one terminal of a light assembly 106 which indicates the "on" condition of the automatic let down control system. A conductor 107 connected to the other terminal of light assembly 106 leads to a terminal 96C on contactor 96. Terminal 96C is connected to one end of coil 97. The opposite end of coil 97 is connected to a conductor 108 leading to one switching terminal of an automatic time delay relay unit indicated generally at 109.

A second light assembly 110 operative to indicate a motor "run" condition is connected by a conductor 110A to terminal 96C.

Automatic time delay relay unit 109 has a normally closed switching element 111 controlled by a relay coil 112. An adjustable electronic time delay device 113 is connected in series with coil 112. Device 113 has a manually adjustable control knob 114. A conductor 115 connects switching element 111 to the contact of control switch 82. Switch 82 has a normally closed switching element 85 that is opened in response to a change in the position of actuator 86 once during each revolution of the silo unloader. A conductor 116 connects time delay device 113 to line 115. The opposite end of coil 112 is connected with a conductor 117 to terminal 96B and to switching element 99, thereby providing power to coil 112. A conductor 120 connects conductor 117 to terminal 96C. The circuit to coil 112 is energized when switching element 85 of control switch 82 is closed, thereby opening the switching element 111.

A pair of conductors 118 and 119 are connected to the contacts for switch elements 98 and 99, respectively. Cable 79 contains the conductors 118, 119, 127, and 128 and 136. Switch element 99 of contactor 96 is connected by a conductor 121 to a manual reversing switch indicated generally at 122. Reversing switch 122 is a double pole, double throw switch and has a pair of movable switching elements 123 and 124 and a manually operated actuator 126. Motor 66 has electrical terminals 66A, 66B, 66C, 66D, and 66E. A conductor 127 connects a first contact 130 to terminal 66C of motor 66. A second conductor 128 connects a second contact 131 to another terminal 66D of motor 66. Switching element 123 is movable to selectively engage contacts 130 and 131. Conductor 121 is connected to a contact 132. Conductor 127 is also connected to a contact 133. Contacts 132 and 133 are selectively engageable by switching element 124. Switching element 123 is connected to the contact of switch element 98 by a conductor 129. Switching element 124 is connected to the conductor 128 which also connects to contact 131. Switch 122 is a two position switch, selectively positioned in a first position where switching elements 123 and 124 engage contacts 130 and 132, respectively, and a second position wherein switching elements 123 and 124 engage contacts 131 and 133, respectively. The circuit for the reversible electric motor 66 also includes a ground conductor 136 connected to terminal 66E.

The operation is as follows:

When continuous-run switch 103 is closed, power winch 49 is continuously operated by motor 66. Reversing switch 122 is used to determine the direction of rotation of motor 66. When continuous run switch 103 is closed a circuit is completed for energizing coil 97 of contactor 96 thereby closing switches 98 and 99. This circuit is from terminal 92B and through conductor 94, terminal 96A, conductor 101, switch 103, conductor 105, terminal 96D, coil 97, terminal 96C, conductor 120, terminal 96B and conductor 95 to terminal 92C. When switch 98 is closed a circuit is completed through motor signal light assembly 110 from terminal 92B, conductor 94, terminal 96A, switch 98, conductor 110A, light 110, conductor 110B, terminal 96C, conductor 120, terminal 96B, and conductor 95 to terminal 92C. Light assembly 110 will emit a light indicating that the circuit is complete and that motor 66 is continuously operating.

The motor run circuit is from terminal 92B, through switch 98 and conductor 118 to motor terminal 66B and from motor terminal 66A and through conductor 119 and switch 99 to terminal 92C. The reversing circuit is from terminal 92B and switch 98, through conductor 129, switch 123 and conductor 127 to motor terminal 66C and from motor terminal 66D, through conductor 128, switch 124, and conductor 121 and switch 99 to terminal 92C when reversing switch 122 is in the up position as shown. When switch 122 is in the down position the circuit across motor terminals 66C and 66D is reversed. In this mode control switch 82 on unloader 17 is not used.

The automatic let-down mode operates as follows. When continuous switch 103 is open and the automatic let-down switch 102 is closed, a circuit is completed from terminal 92B, through conductor 94, terminal 96A, conductor 101, switch 102, conductor 104, light 106, conductor 107, terminal 96C, conductor 120, terminal 96B and conductor 95 to terminal 92C. A parallel circuit extends from switch 102, through conductor 104, control switch 82, conductor 115, switch 111 of relay 109, conductor 108, terminal 96D, coil 97, terminal 96C, conductor 120, termainal 96B and conductor 95 to terminal 92C. Another parallel circuit extends from switch 82, through conductor 115, conductor 116, time delay device 113, coil 112, conductor 117, terminal 96B and conductor 95 to terminal 92C. Control switch 82 is normally closed as is relay 109. When a circuit is completed across time delay device 113 and coil 112, coil 112 is energized and switch 111 opened only after a time delay determined by the adjustment of member 114. In an actual embodiment, this time delay can be adjusted from approximately one second to three minutes. Thus, any time that the automatic let-down switch 102 is closed, winch motor 66 will run until the time delay relay 112 opens the circuit. Thereafter, each time that control switch 82 is opened in response to a revolution of unloader collector 18, the time delay relay 112 closes switching element 111 energizing contactor coil 97 and thus operating motor 66. Motor 66 is energized through reversing switch 122 so that its direction of operation will depend upon the position of the reversing switch elements 123 and 124.

The time delay relay 112 has a relatively short reset timed so any time the circuit to it is broken (even if only a momentary interruption) it will reset and close. Control switch 82 with its elongated actuator 86 will remain open between 10 to 15 seconds of each revolution of the unloader collector 18. Actuator 86 must move over moving arm 87 which holds switch element 85 in the open position for a short period of time. Any momentary break in the circuit will reset timed delay relay 109. Relay 109 is adjusted by electronic time delay device 113. The adjustment can be from approximately one second to up to three minutes or more. This controls the duration of the operation of motor 66. With switch 122 in the "down position", unloader 17 will be lowered a predetermined amount during each revolution of the unloader collector 18 in the silo. The amount of lowering of unloader 17 is easily adjusted by adjusting time delay device 113. Control knob 114, being part of time delay device 113, provides for easy manual adjustment of the time delay and thereby the lowering time per revolution of the unloader in the silo.

While there has been shown and described a preferred embodiment of the invention, it is understood that changes in the structure and electrical circuit and components can be made by those skilled in the art without departing from the invention. The invention is defined in the following claims.

The embodiments of the invention in which an exclusive property or privilege is claimed are defined as follows:

1. In a silo unloader operable to remove material from a tower silo, said unloader having a material collector and means for discharging material therefrom, said silo unloader including a portion rotatable within the silo and means for rotating the same, winch means having an electric motor, a cable connecting the winch means and silo unloader, means suspending the cable from the upper portion of the silo whereby upon operation of the motor the silo unloader is vertically moved in the silo, and control means electrically connected to the electric motor for controlling its operation and thereby the vertical position of the silo unloader in the silo, the improvment wherein said control means includes
   a control switch non-rotatably mounted with respect to the silo unloader,
said switch having an actuator disposed in the path of and operably engagable by the rotatable portion of the silo unloader once during each revolution of said rotatable portion thereby to trigger the control switch,
and means connected to said switch for operating said electric winch motor for a limited period of time to lower the silo unloader each time the said switch actuator triggers the control switch.

2. The improved silo unloader of claim 1 wherein: the means connected to the switch includes a switching element connected in series with the control switch, a relay coil operable to open the switching element, and delay means connected to the relay coil for delaying the switching of the switching element whereby the electric motor is operated only a limited period of time each time the actuator triggers the control switch.

3. The improved silo unloader of claim 2 including: means to adjust the delay means for varying the delay time of the relay coil, and thereby the run time of the motor.

4. The improved silo unloader of claim 1 wherein: the control means includes a motor reversing switch connected to the electric motor whereby the electric motor is selectively operated in opposite directions.

5. The improved silo unloader of claim 1 wherein: said rotatable portion includes an arm engageable with the actuator once during each revolution of the collector.

6. The improved silo unloader of claim 1 wherein: the silo unloader has a non-rotating portion including a frame connected to the cable, said control switch being mounted on the frame.

7. The improved silo unloader of claim 6 wherein: said rotatable portion includes an arm located below said frame, said arm engageable with the actuator once during each revolution of the collector.

8. The improved silo unloader of claim 1 wherein: said control switch has a normally closed switching element that is opened in response to movement of the actuator.

9. The improved silo unloader of claim 1 wherein: the control means includes first on-off switch means connected in series with the control switch to connect the control switch to a power source, and a second on-off switch means operable to continuously connect the winch motor to a power source.

10. The improved silo unloader of claim 1 wherein: the control means includes contactor means having switching means operable to connect a power source to the winch motor, and a relay coil operable to control the switching means, said coil being connected to a time delay means to control the operation of the relay coil.

* * * * *

UNITED STATES PATENT AND TRADEMARK OFFICE
CERTIFICATE OF CORRECTION

PATENT NO. : 4,289,437
DATED : September 15, 1981
INVENTOR(S) : Glen D. Hansen

It is certified that error appears in the above-identified patent and that said Letters Patent are hereby corrected as shown below:

Column 8, line 12, "winch" should be --electric--.

Column 8, line 16, "winch" should be --electric--.

Signed and Sealed this

Twenty-fourth Day of November 1981

[SEAL]

Attest:

GERALD J. MOSSINGHOFF

Attesting Officer

Commissioner of Patents and Trademarks